Dec. 15, 1931.  H. A. SEYMOURE  1,836,557
FINGER NAIL CLIP
Filed May 20, 1929
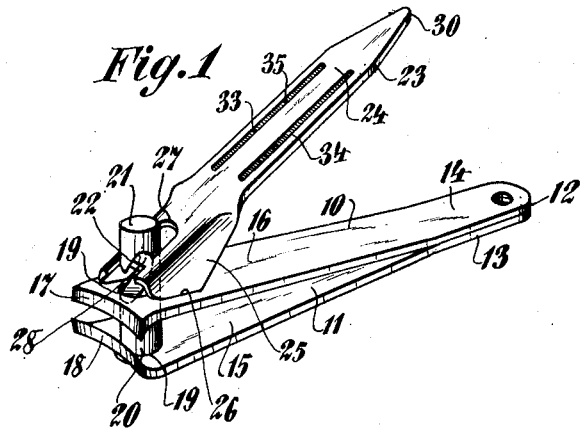
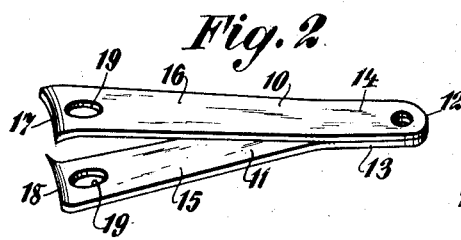
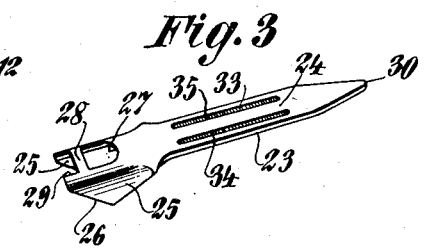
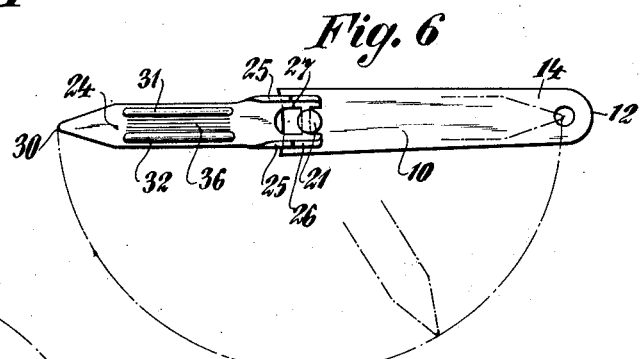
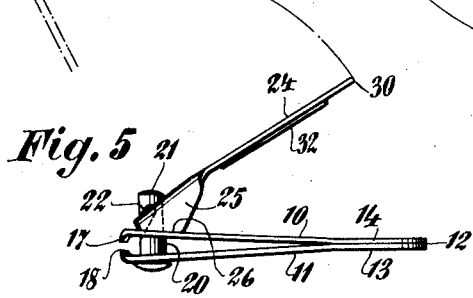
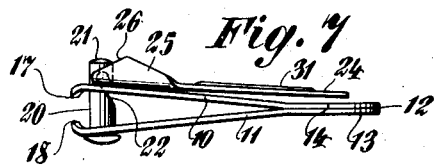
INVENTOR
Horace A. Seymoure,
BY HIS
Warren S. Orton
ATTORNEY Patented Dec. 15, 1931

1,836,557

UNITED STATES PATENT OFFICE

HORACE A. SEYMOURE, OF NORWALK, CONNECTICUT, ASSIGNOR TO HORACE A. SEYMOURE, INCORPORATED, OF NORWALK, CONNECTICUT, A CORPORATION OF CONNECTICUT

FINGER NAIL CLIP

Application filed May 20, 1929. Serial No. 364,686.

The invention relates in general to a manicuring implement of the type in which two resilient blades are secured together at one end and have inturned cutters at the other end and which cutters are moved into operative engagement by means of a cam actuating lever secured to a swivel bolt passed through apertures adjacent the cutter forming ends of the resilient members.

In such devices as heretofore known it was a usual construction to secure the actuating cam lever to the swivel bolt either by means of a pin form of pivot or the actuating lever was secured in place by means of a pin and slot connection. These prior constructions possessed several inherent disadvantages, the pivot pin form of mounting being difficult to assemble as a cheap factory proposition and the pin and slot form of construction having the disadvantage of permitting an accidental demounting of the assembled parts when subjected to careless or rough usage.

Accordingly, the primary object of the invention is to provide a simple form of manicure implement of the type above outlined, and which features a simplified form of connection between the swivel bolt and the operating cam lever, so as to permit the marketing of such an article at an extremely low price.

Broadly, this object of the invention is attained by providing the component parts as simple one-piece pressings and in providing the swivel bolt with an undercut notch designed to permit the ready insertion therein of a pivoting cross bar formed on the operating cam lever at the time it was punched to shape.

Another object of the invention is to provide in connection with the operating cam lever element of the combination, a form of nail file which will present a slightly concaved filing surface, designed to conform, at least roughly, to the configuration of the end of the finger-nail, and which at the same time can be formed as a part of the stamping operation which formed the operating cam lever, and without necessity of machining the part to provide the requisite concaved filing surface.

This object of the invention is attained by forming on one side of a flat portion of the operating lever a pair of parallel ribs and a series of file ridges disposed between the ribs in such way that the ribs and file ridged surface form in effect a concave surface.

Various other objects and advantages of the invention will be in part obvious from an inspection of the accompanying drawing and in part will be more fully set forth in the following particular description of one form of mechanism embodying my invention, and the invention also consists in certain new and novel features of construction and combination of parts hereinafter set forth and claimed.

In the accompanying drawings:

Fig. 1 is a view in perspective of a manicuring implement constituting a preferred embodiment of the invention;

Fig. 2 is a perspective view of the resilient members shown in Fig. 1 with the operating lever and swivel bolt removed;

Fig. 3 is a similar view of the operating cam lever;

Fig. 4 is a view of the swivel bolt;

Fig. 5 is a view in side elevation showing in full lines the cam lever in operative position to actuate the cutters, and showing in dotted line the position of the cam lever in its movement into position to be folded against the adjacent resilient member;

Fig. 6 is a plan view showing in full lines the position of the cam lever when swung from the dot and dash positions into the distended position prior to being turned over into the position shown in Figs. 1 and 5; and Fig. 7 is a showing in side elevation of the cam lever folded into its out of the way inoperative position.

In the several drawings there is shown two resilient members 10 and 11 superposed and welded together at one end 12. Portions 13 and 14 adjacent said end 12 lie in contact with each other and other portions 15 and 16 extend from the contacting portions divergently of each other and have their free ends inturned towards each other to form coacting cutters 17 and 18. Each of the members 15 and 16 is provided with an aperture 19 in axial alignment. A swivel bolt 20 is rotatably mounted in the aligned apertures 19 and is provided adjacent its upper end 21 with a transversely extending and undercut notch 22 cut inwardly and upwardly from one side of the bolt 20. This notch is disposed opposite the portion 16 when the resilient members are in their normal position as shown in Fig. 7.

The cutters are moved into their cutting position against the resiliency of the members 10 and 11 by means of an operating cam lever 23, more particularly shown in Fig. 3. The cam lever is an integral pressing and comprises largely a flat bar 24, the opposite edges at one end provided with a pair of integral flanges 25. The forward edges of these flanges are beveled as shown at 26 to form cams adapted to bear on the portion 16 of the resilient member 10 and coacting with the swivel bolt 20 to cause the cutters to approach each other. The portion of the lever 23 between the flanges 25 is recessed to provide a bolt aperture 27 and the forward side of this aperture is outlined by a cross bar 28, and in advance of the cross bar the adjacent edge of the lever is provided with an end recess 29.

The free end of the operating cam lever is pointed and somewhat flattened as shown at 30 to form a nail cleaner.

During the process of forming the operating cam lever the flat surface 28 is subjected to a die pressing operation which forms a pair of parallel rounded top ribs 31 and 32 on one side of the blade, and there is similarly formed on the reverse side a pair of slotted depressions 33 and 34. The depressions 33 and 34 are provided with a series of transversely extending file ridges 35 which form long, narrow file surfaces designed to engage the fingernail in filing the same across the top of the nail and in a direction substantially parallel to the plane of the nail.

Between the ribs 31 and 32 on the reverse side of the lever are a series of filing ridges 36 extending parallel to and disposed between the ribs 31 and 32. While it is true that the portion of the blade provided with the file ridges 36 is substantially flat, the effect of the upstanding rounded top ribs at opposite sides of the filing surface is to form in effect a concaved filing surface designed to conform, at least somewhat roughly, to the configuration of the ends of the fingernails. This construction is designed to permit a filing of the nail while the blade extends substantially perpendicular to the plane of the nail.

This disclosure features a construction which is designed to economize in manufacturing costs so as to produce an article which can be marketed cheaply. The resilient members as well as the operating lever are simply pressings, and the conventional swivel bolt may be easily provided with the peculiar hook shaped notch disclosed in Fig. 4. The resilient members 10 and 11 are easily welded together at their contacting ends to form the unit shown in Fig. 2. In assembling the cam operating lever in position it is simply necessary for the assembler to pass the swivel bolt upwardly through the apertures and by manually depressing the resilient members towards the closed portion as shown in Fig. 5 the lever may be positioned in place first by disposing it in the position shown in dotted lines in Fig. 5 and then shoving it towards the end 12 until the cross bar 28 engages in the open end of the notch 22. Releasing the holding pressure on the resilient members permits the portion 16 to react on the lever forcing the cross bar upwardly as shown in Fig. 5 and until the cross bar engages the upper closed end of the notch in which position it is held by the resiliency of the two members 10 and 11 acting through the swivel bolt. It is apparent from this construction that the cam lever may be disposed in the operative position shown in Figs. 1 and 5 and in which case the cam 26 is in operative position bearing on the adjacent face of the resilient member 10. Pressing downwardly on the free end of the cam lever will cause the cam to rock about its high point and in its effort to elevate the swivel bolt the cutters will be brought into cutting relation. Releasing pressure on the actuating lever permits the cutters to be restored to their normal open position due to the resiliency of the members of which they form a part. The operating cam can be swung about the swivel bolt and into the position shown in Fig. 7 where the cam lever rests flat against the adjacent resilient member with the cam forming flanges projecting outwardly therefrom and serving to protect the end of the swivel bolt as shown in Fig. 7.

I claim:

1. In a nail clipper, a one-piece stamping one portion of which is substantially flat, one side of said portion provided in spaced relation to its longitudinal edges with a pair of die-pressed parallel rounded top ribs extending longitudinally of the blade, the portion of the side between the ribs provided with file ridges and coacting with the ribs to form a nail file somewhat concaved in transverse section.

2. A nail clipper comprising a long one piece flat stamping including a substantially flat portion provided on one face with a pair of parallel file slots in spaced relation to the edges of the pressing, a pair of round top ribs projecting from the opposite face of the pressing and opposed to the file slots in the first named face and file ridges disposed between said ribs and in the file slots.

3. A nail clipper comprising a one piece lever including a substantially flat portion provided at one end with means adapted to coact with other means for mounting the same in place, a pair of parallel file slots in one side of said blade, and a pair of ribs projecting from the opposite side and opposed to the file slots.

Signed at New York, in the county of New York and State of New York, this 7th day of May, A. D. 1929.

HORACE A. SEYMOURE.